United States Patent [19]

Daman

[11] Patent Number: 5,723,045
[45] Date of Patent: Mar. 3, 1998

[54] PROCESS AND APPARATUS FOR SUPERCRITICAL WATER OXIDATION

[75] Inventor: Ernest Ludwig Daman, Mountainside, N.J.

[73] Assignee: Foster Wheeler Development Corporation, Livingston, N.J.

[21] Appl. No.: 696,222

[22] Filed: Aug. 13, 1996

Related U.S. Application Data

[62] Division of Ser. No. 320,426, Oct. 14, 1994, Pat. No. 5,571,423.
[51] Int. Cl.$^6$ ................................................. C02F 1/72
[52] U.S. Cl. .......................... 210/175; 210/198.1; 210/205; 422/184.1; 422/242
[58] Field of Search ............................ 210/175, 198.1, 210/205; 422/184.1, 242

[56] References Cited

U.S. PATENT DOCUMENTS

| | | | |
|---|---|---|---|
| 3,881,701 | 5/1975 | Schoenman et al. | 259/4 |
| 3,914,347 | 10/1975 | Kors et al. | 261/23 |
| 3,914,348 | 10/1975 | Kors et al. | 261/23 |
| 4,113,446 | 9/1978 | Modell et al. | 48/202 |
| 4,338,199 | 7/1982 | Modell | 210/721 |
| 4,818,371 | 4/1989 | Bain et al. | 208/106 |
| 4,822,497 | 4/1989 | Hong et al. | 210/721 |
| 5,008,085 | 4/1991 | Bain et al. | 422/109 |
| 5,252,224 | 10/1993 | Modell et al. | 210/695 |
| 5,262,060 | 11/1993 | Lehmann et al. | 210/696 |
| 5,384,051 | 1/1995 | McGinness | 210/761 |
| 5,387,398 | 2/1995 | Mueggenburg et al. | 422/168 |
| 5,437,798 | 8/1995 | La Roche et al. | 210/761 |

FOREIGN PATENT DOCUMENTS

| | | |
|---|---|---|
| 0612697 | 8/1994 | European Pat. Off. |
| 0656321 | 6/1995 | European Pat. Off. |
| WO92/21621 | 12/1992 | WIPO |
| WO94/18128 | 8/1994 | WIPO |

OTHER PUBLICATIONS

Gloyna, et al., "Supercritical Water Oxidation: An Engineering Update," stated to be presented to Gulf Coast Hazardous Research Center, Lamar University, Beaumont, TX, Feb. 1992, 25 pages.

"Assessment and Development of an Industrial Wet Oxidation System for Burning Waste and Low-Grade Fuels," Stone and Webster Engineering Corp., Final Report, Sep. 1989.

*Primary Examiner*—Neil McCarthy
*Attorney, Agent, or Firm*—Fitzpatrick, Cella, Harper & Scinto

[57] ABSTRACT

An improved process and apparatus are disclosed for the supercritical water oxidation of organic waste materials which avoids or at least substantially reduces the corrosion and solids deposition problems associated with prior art techniques. According to this invention, externally heated supercritical water is fed to a platelet tube reactor to both protectively coat its inner surface and heat the waste stream to oxidation reaction conditions. Higher reaction temperatures can be used as compared to prior art processes, which significantly improves the reaction rate and permits smaller reactors to be used. The protective film of water on the reactor inner surface, coupled with the elimination of preheating of the waste material, substantially reduces solids deposition and corrosion.

5 Claims, 7 Drawing Sheets

PROCESS AND APPARATUS FOR SUPERCRITICAL WATER OXIDATION

This application is a division of application Ser. No. 08/320,426, filed Oct. 14, 1994, which is now U.S. Pat. No. 5,571,423.

BACKGROUND OF THE INVENTION

1. Field of the Invention

This invention relates to a process and an apparatus for supercritical water oxidation and, in particular, to such a process and apparatus useful for the destruction of organic waste materials.

2. Description of the Prior Art

It is known that the fluid and solvating properties of water change dramatically at its thermodynamic "critical point"—i.e., at a temperature of about 706° F. and a pressure of about 3204 pounds per square inch ("psi"). In particular, water above its critical point is a single-phase fluid which is completely miscible with oxygen and most organic compounds. At supercritical water conditions, mass transfer limitations which limit the usefulness of oxidation processes in subcritical water are eliminated and the solubility of inorganic salts drops to the parts per million range. With the addition of oxygen, efficient destruction of organic compounds by oxidation is achieved, while inorganic substances can be separated and withdrawn for disposal. Specifically, organic compounds may be oxidized in supercritical water to produce carbon dioxide and water. Following the oxidation, inorganic materials may be removed as dry solids or precipitated as salts and removed as a brine. A significant advantage of such a process is the extremely short residence time required, on the order of 5–20 seconds depending on process temperature, for destruction of organic compounds.

Supercritical water oxidation—defined as a process for oxidizing organic waste compounds in supercritical water—has emerged as a potentially environmentally attractive technique for the safe and effective treatment of toxic organic wastewaters and sludges. However, while organic compounds are completely miscible in supercritical water, inorganic salts present in the aqueous waste materials, or generated during the oxidation reaction, are essentially insoluble and may be deposited as solids on reactor and other system surfaces, which may lead to plugging and low operating efficiencies. In addition to that solids deposition problem, corrosion of reactor and system surfaces has also occurred in supercritical water oxidation processes. Due to these problems, supercritical water oxidation has not been successfully commercialized for the treatment of organic wastes and sludges.

Various attempts have been made to rectify these problems. For instance, U.S. Pat. No. 4,822,497 discloses a reactor designed so that the supercritical temperature process stream is transferred to a cooler zone in the same vessel at high pressure to form a brine which facilitates the removal of solids. More recently, U.S. Pat. No. 5,252,224 discloses a supercritical water oxidation process in which the reaction mixture is passed through the reactor at a velocity sufficient to prevent settling of a substantial portion of the solid particles from the reaction mixture.

There is still a need for a supercritical water oxidation process and system which avoids the above-mentioned significant problems of solids deposition and corrosion.

SUMMARY OF THE INVENTION

The present invention provides a process and apparatus for the supercritical water oxidation of organic waste and other materials, which avoid the solids deposition and corrosion problems of the prior art. In particular, according to the present invention, organic waste material is oxidized in supercritical water in a tubular reactor which comprises an inner platelet tube, having a central reaction zone, supported within an outer shell. The waste material, along with a suitable oxidant, is fed to the central reaction zone under pressure and at variable temperature. Externally preheated supercritical water is fed to the annular space between the platelet tube and the shell where, due to the pressure differential between the annular space and the reaction zone, it flows through the fluid passages provided in the wall of the platelet tube and forms a thin, protective film on the inner surface of the platelet tube. This flow also serves to preheat the waste/oxidant stream in the reaction zone to a temperature which would initiate oxidation of the organics contained therein. Since the waste stream is not preheated substantially before reaction, and further in view of the protection afforded by the thin film of supercritical water on the inner platelet tube surface of the reaction zone, solids deposition on, and corrosion of, that surface is substantially eliminated. In addition, also because of the protection afforded by the thin film of water on that surface, a higher reaction temperature may be employed, which improves the overall efficiency of the reaction and permits use of a smaller reactor. As a result, the required capital investment and operating costs are lower than they would ordinarily be without the advantages of the present invention.

The present invention also includes, in one embodiment, the use of a submerged burner or combustor at the inlet of the platelet tube, at which a fuel is ignited to increase the temperature of the incoming waste stream. The burner may be used together with injection into the reactor of clean, preheated, supercritical water to heat the waste stream to reaction temperature.

According to a further embodiment of the present invention, if no or less than the stoichiometric amount of oxygen is added to the reactor, by taking advantage of the dramatic difference in solubilities between organics and inorganics in supercritical water the process may be operated to separate organic from inorganic substances. Unreacted organic substances may then be vented along with any gaseous reaction products and, if desired, subsequently oxidized in a gas turbine combustor, a steam generator or other suitable devices.

DESCRIPTION OF THE PREFERRED EMBODIMENTS

Generally, a supercritical water oxidation process comprises feeding an aqueous waste stream containing organic compounds, or a pumpable organic sludge, to a reactor along with an oxidant source and, optionally, supplemental fuel if the heat value of the waste is low. Following oxidation of the organics in the reactor under conditions of temperature and pressure above the critical point of water, solid/liquid and vapor/liquid separations are required.

Figure 1:
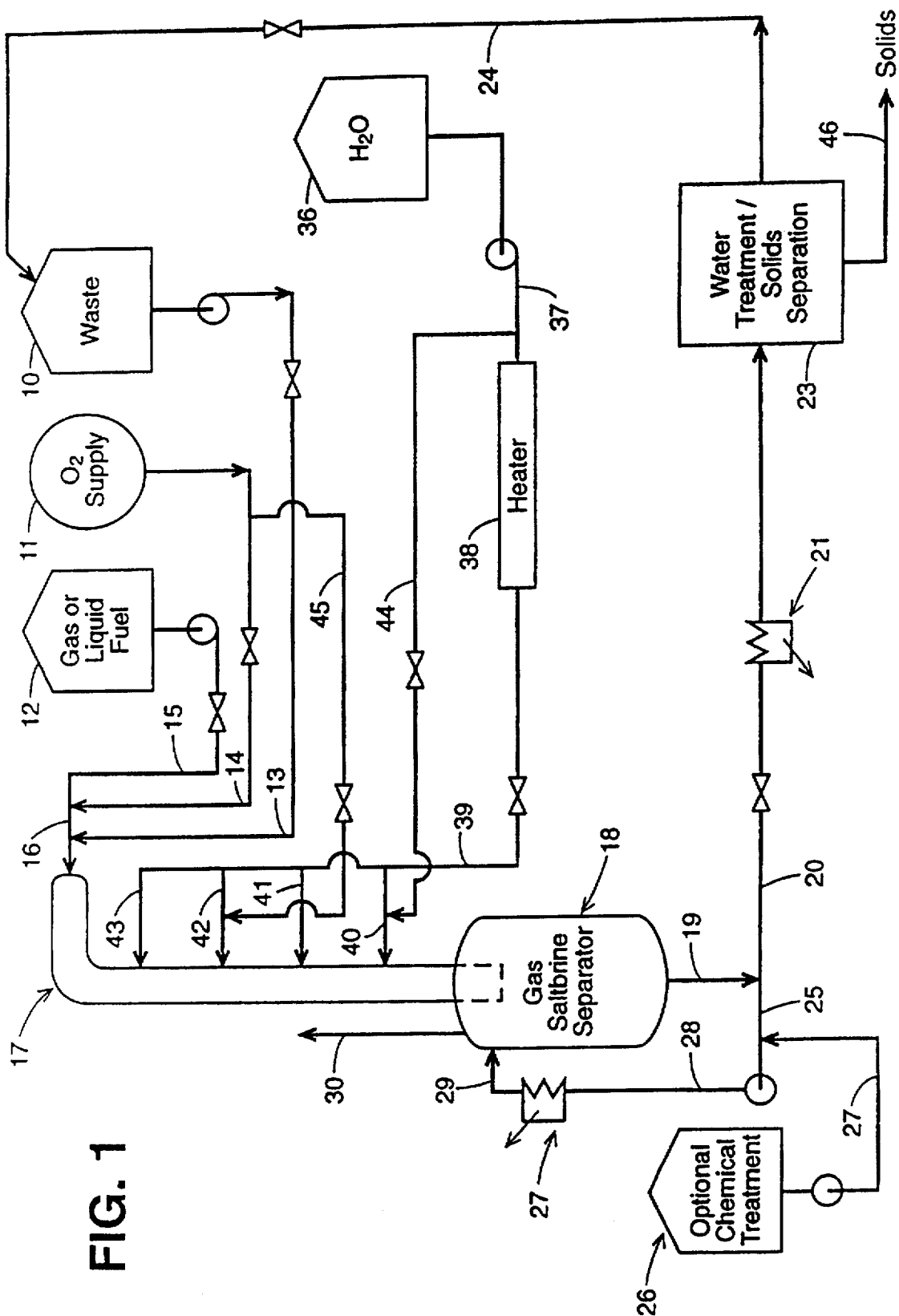
FIG. 1 illustrates one embodiment of a process and apparatus useful for supercritical water oxidation according to the present invention.

FIG. 1 illustrates one embodiment of a process and apparatus of the present invention for the supercritical water oxidation of an organic waste material. Although it is not the intention to be limited to the specific arrangement shown in FIG. 1, for convenience the present invention will be explained and illustrated by reference to that figure.

As shown in FIG. 1, a waste material from source 10 at a high pressure (e.q., about 4000 psi) is fed via lines 13 and 16 to a tubular reactor 17. The temperature of the waste is typically ambient (e.g., about 70° F.) but may be higher. Depending on the waste material, the temperature should be no more than about 650° F. High pressure has a beneficial effect on the kinetics of the oxidation reaction in some cases. Accordingly, the minimum pressure is about 3500 psi, and it is preferred that the pressure of the waste fed to the reactor is within the range of from about 4000 psi to about 6000 psi.

Oxygen or other suitable oxidizing agent is also supplied to the reactor 17 from source 11 via lines 14 and 16. Alternatively, or in addition, oxygen (or other oxidant) may be supplied to one or more points along the length of the reactor. For example, as shown in FIG. 1, oxygen may be supplied to reactor 17 through lines 45 and 42. The place of oxidant addition to the reactor depends on the properties of the particular waste being treated. The addition of oxygen along the length of the reactor permits control of the reaction rate, and hence the temperature rise, within the reactor.

In one embodiment of the present invention, useful when the intrinsic heat value of the waste material is low, a supplemental fuel from source 12 is also fed to the reactor along with the pressurized stream of waste material and oxidant, via lines 15 and 16. Any convenient gaseous or liquid fuel may be employed (e.g., alcohol, methane, methanol, etc.). Ignition of the supplemental fuel in the reactor provides the additional energy necessary to sustain the oxidation reaction. Preferably, however, the temperature of the pressurized waste/oxidant stream is increased from about ambient to reaction temperature by injection of water at supercritical conditions into the waste stream at one or more stages along the tubular reactor.

Reactor 17 generally comprises a platelet tube concentrically supported within a tubular shell. By "platelet tube" is meant a tube whose wall is formed of a plurality of stacked, thin plates having a large number of precisely engineered fluid passages formed therein to allow a fluid such as water to pass through the wall from outside to inside, the number and shape of the interior openings of those fluid passages being designed to provide a thin, protective film of water on substantially the entire interior platelet tube surface.

Platelet tubes are known to be useful, for example, in cooling surfaces of aerospace vehicles. They are commercially available from Aerojet-General Corporation, Rancho Cordova, Calif.

Generally, platelet tubes may be designed to heat the waste stream to reaction temperature and provide protection to the inner reactor surface. In order to heat the waste stream, the platelet wall fluid passages may be designed to inject relatively large streams of supercritical water directly into the main body of the waste stream at appropriate points along the length of the reactor. In order to protect the inner surface of the platelet tube from solids deposition and corrosion, the platelet wall may also include a large number of smaller openings for injecting supercritical water into the region along that wall. The particular design of such smaller openings is not critical and may be varied as long as an adequate protective thickness of clean, supercritical water is provided on substantially the entire inner surface of the platelet tube. For example, a "transpiration" type platelet tube may be employed, in which a large number of small openings are provided in the plate forming the inner surface of the tube such that fluid is injected essentially in a direction perpendicular to the tube inner surface. The net result of this type of fluid injection is that the injected fluid will mix with the main flow of waste and simultaneously provide a thin film of clean supercritical fluid along the reactor wall.

Alternatively, and in a preferred embodiment, the small surface openings are specially designed to inject the fluid in a direction substantially parallel to the interior tube surface, laying down on that surface a thin protective film of supercritical fluid. In this embodiment, that protective film will be provided for a short length along the interior tube wall from each aperture, after which the fluid will tend to mix with the main body of waste and increase its temperature. In another embodiment, both types of small openings (i.e., perpendicular and parallel injection) may be provided in the platelet tube inner surface to simultaneously heat the waste stream and protect the platelet tube inner surface.

Figure 3:
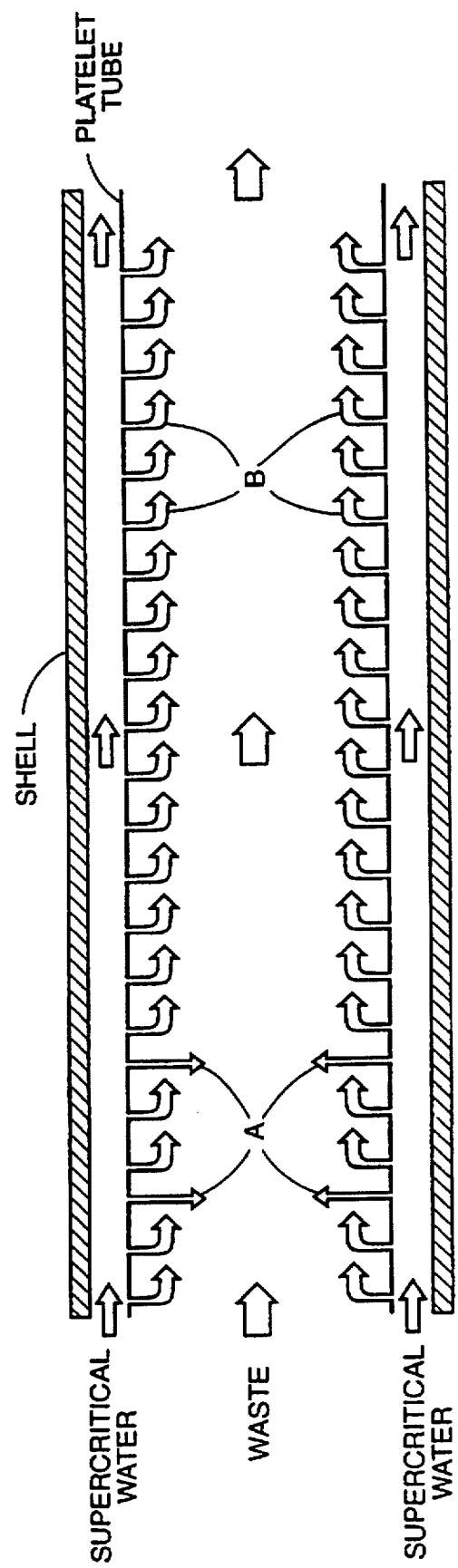
FIGS. 3–8 show, in even more detail, several embodiments of platelet tube-type reactors which may be used in the present invention.

FIG. 3 schematically illustrates how the supercritical water may be supplied to the central passage of the platelet tube to both heat the waste stream and form a protective film along the inner surface of the platelet tube. As shown, waste is fed to and along the central passage of the platelet tube and supercritical water is fed to the annulus between the platelet tube and the shell. Fluid passages in the platelet tube wall, and a pressure drop across that wall, permit supercritical water to flow from the annulus through the tube wall and then into the central passage of the tube. The direction and amount of flow of supercritical water into the central passage is controlled by the size and shape of the fluid passages in the tube wall. For example, in order to heat the waste in the central passage, a number of generally perpendicular streams (designated "A" in FIG. 3) may be provided, whereas a large number of generally parallel streams (designated "B" in FIG. 3) provide wall protection.

Figure 4:
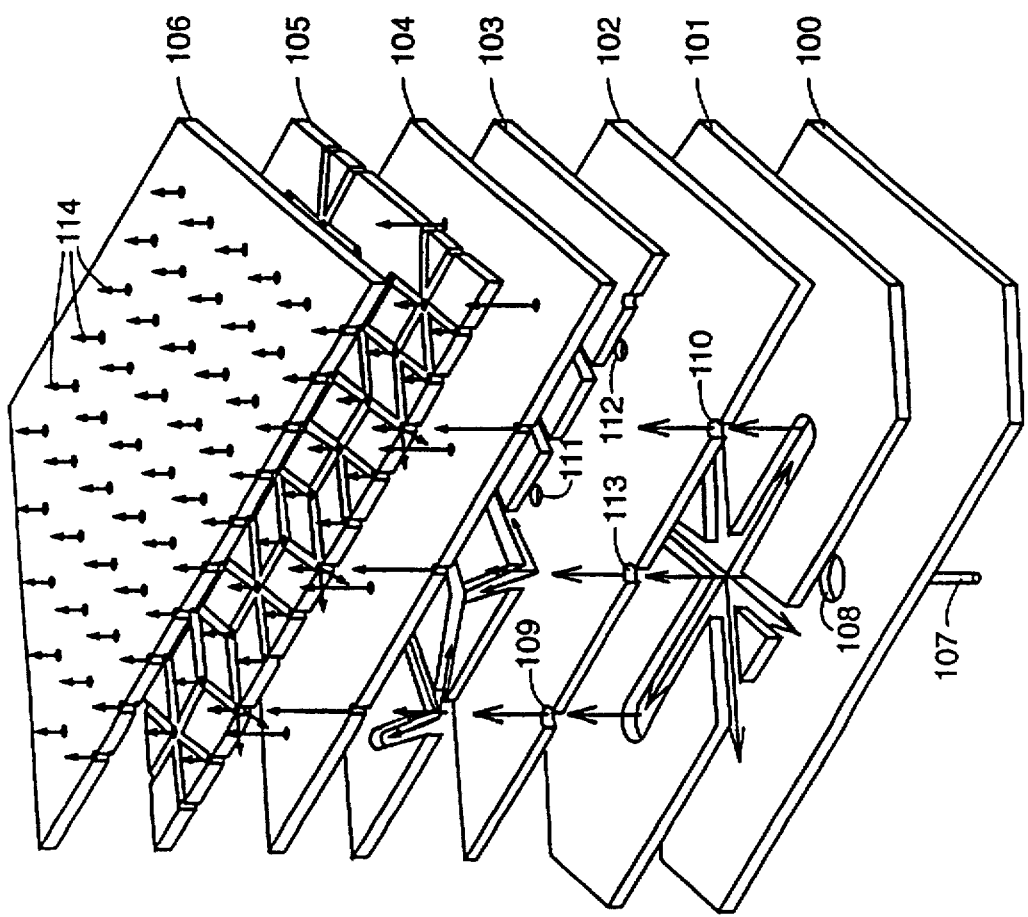

An example of a fluid flow pattern through the platelet tube wall that efficiently covers its inside surface with a protective layer of supercritical water is illustrated in FIG. 4. That figure shows an exploded view of a portion of a platelet tube wall composed of seven different plates 100 through 106. The pattern of flow in the illustrated embodiment is essentially hexagonal, with a single fluid inlet stream 107 being dispersed into 1,134 flow paths at the opposite side of the platelet wall. Specifically, a single fluid inlet stream 107 enters the tube wall through hole 108 in plate 100 and is immediately evenly distributed by six channels in plate 101 to six outlets on the hexagon in plate 102 (only four of which, reference numerals 109 through 112, are shown in FIG. 4) as well as flowing straight through hole 113 in plate 102. The stream in each of those outlets is then split into six other streams by hexagonal channels in plate 103, and a stream which flows straight through. The process is repeated through plates 104, 105 and 106 until the fluid finally exits the wall as 1,134 separate streams schematically illustrated 114 in FIG. 4.

Figure 5:
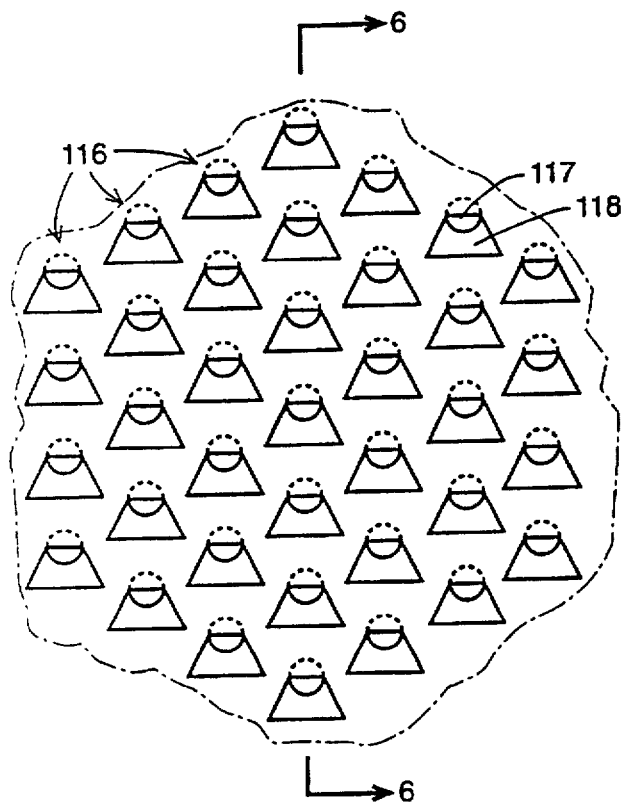
Figure 6:
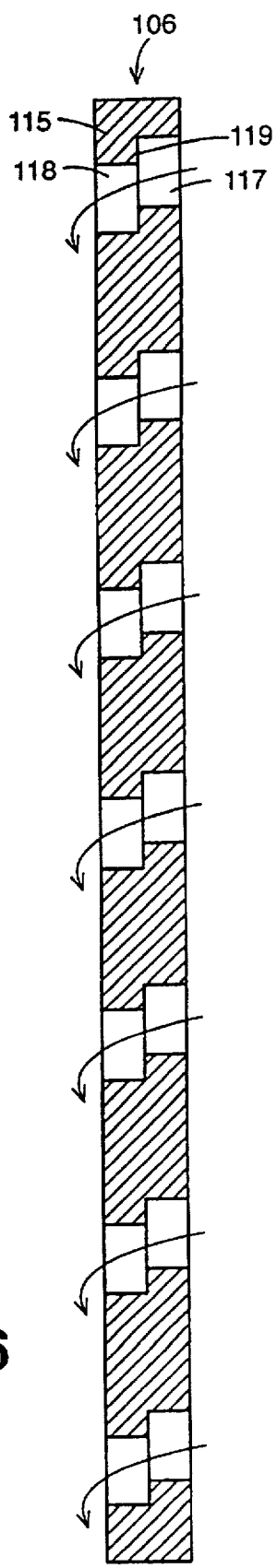

The shape of the apertures in plate 106 determines the direction of the fluid stream exiting those apertures into the central portion of the platelet tube. For example, FIGS. 5 and 6 illustrate an embodiment which creates a flow of fluid in a direction generally parallel to the flow of waste and along inner surface 115 of the platelet tube. FIG. 5 (which is a plan view of a portion of the inside surface of the platelet tube) shows a plurality of apertures 116 in plate 106, each aperture being defined by a circular opening 117 partially overlaid by a trapezoidal opening 118. As shown best in FIG. 6 (which is a cross-section taken along line 6—6 of FIG. 5), fluid flowing out through circular opening 117 is deflected by surface 119 so as to flow along inside tube surface 115. The apertures may be formed by any convenient technique, as is apparent to those of ordinary skill in the art.

Figure 7:
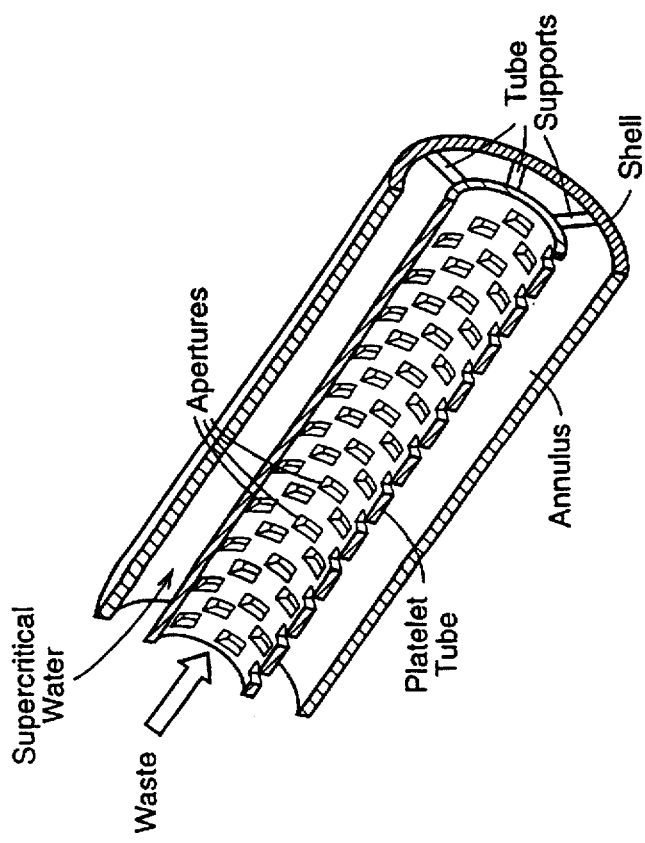

FIG. 7 illustrates an alternative embodiment in which the many apertures in the inner surface of the platelet tube are shaped such that the fluid streams emanating from them are directed substantially perpendicular to the inner surface of the tube, as shown schematically in FIG. 4. However, in addition to mixing with the main body of the waste stream to heat it, these many streams of clean, supercritical water also flow along the interior wall of the platelet tube to form a thin protective film.

Figure 8:
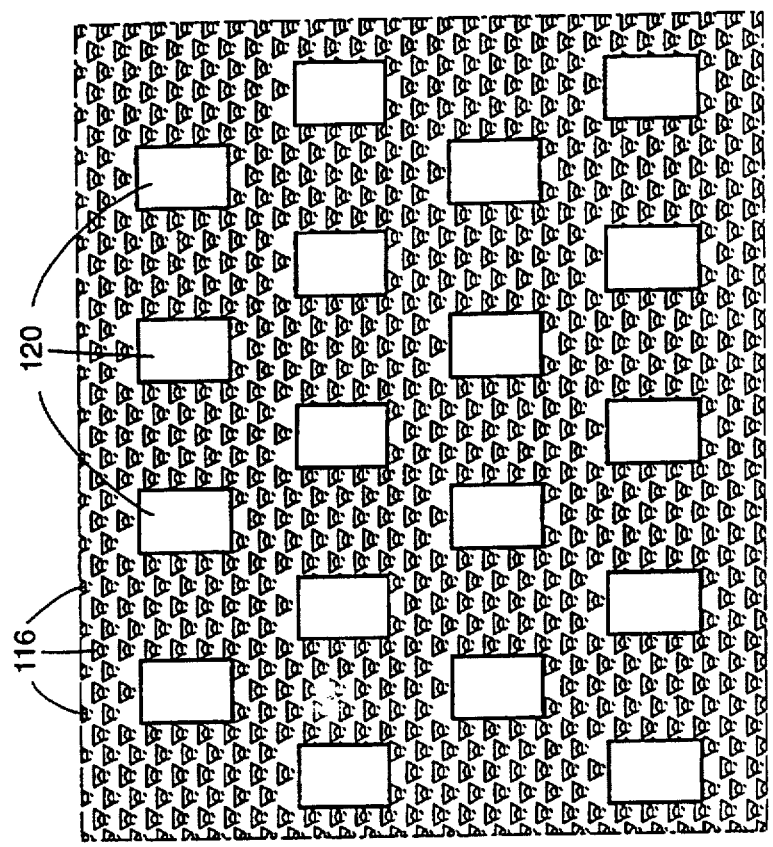

FIG. 8 illustrates yet another embodiment in which a combination of transpiration apertures 120 and wall protection apertures 116 are provided in the inner surface of the platelet tube. With such a design, and by appropriate selection of the number and size of each type of aperture, the degree of wall protection can be controlled along with the effect on the temperature of the waste stream in the reactor by the injected supercritical water.

Figure 2:
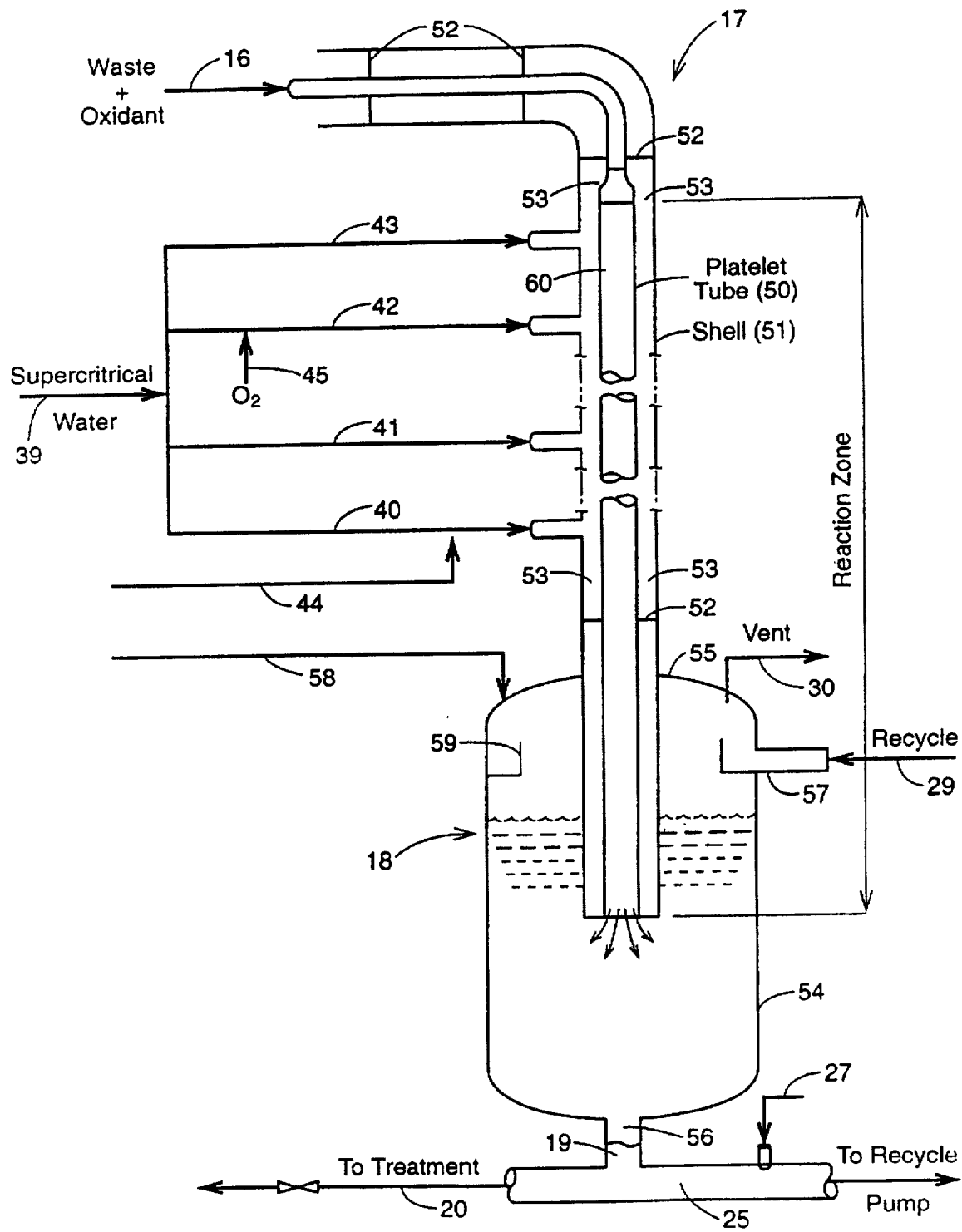
FIG. 2 shows, in more detail, one embodiment of a reactor which may be used in the present invention.

Reactor 17 is shown in more detail in FIG. 2, where the same reference numerals indicate the same elements as in FIG. 1. As illustrated in FIG. 2, reactor 17 comprises a platelet tube 50 concentrically supported within a tubular shell 51 and support members 52. The particular supporting means employed is not important, and those skilled in the art can select appropriate supports depending upon the specific size and design of the reactor. The platelet tube 50 defines a center tubular passage 60 into which the waste/oxidant mixture is fed for reaction. Between the outer wall surface of platelet tube 50 and the inner wall surface of shell 51 is provided an annular space 53 into which supercritical water is injected at one or more locations along the length of the reaction zone. Because of the differential between the relatively high pressure of the injected supercritical water in annular space 53 and the somewhat lower pressure of the waste stream in center passage 60, the supercritical water readily flows from the annular space 53 through the fluid passages provided in the wall of the platelet tube 50, into center passage 60. As noted above, the fluid passage apertures provided on the inner surface of platelet tube 50 are designed to disperse the injected supercritical water as a thin film along that inner surface. As a result, the temperature of the waste/oxidant mixture in central passage 60 is increased while the thin film of water along the inner surface of platelet tube 50 protects that surface against deposition of solid material and corrosion. The thickness of the protective film is not critical. It is only necessary that the supercritical water be provided to the platelet tube so that a film is formed on the inner surface thereof so as to form a substantially continuous isolating layer of pure fluid between the reactor wall and the waste stream undergoing reaction.

The number and location of points along the reactor at which supercritical water is introduced into the annulus 53 are not critical and depend on, for example, the temperature, flow rate and heat content of the waste stream, the temperature and flow rate of the supercritical water, the size of the reactor, etc. Although four points of addition are shown in FIGS. 1 and 2, that is merely illustrative. A single addition may be sufficient. Those skilled in the art can determine the particulars of how the supercritical water is injected into the annulus. Generally, the water injection along the length of the reactor is varied to allow temperature control within the reactor, provide an even flow distribution of water along the length of the platelet tube, assure substantially complete coverage of the surface of the reaction zone by a protective film of clean supercritical water, etc.

A substantial advantage of the present invention is the avoidance of solid deposition and corrosion on the reactor walls. This is accomplished by providing the thin, protective film of water on the interior surface of the reactor tube, as described above, and also by eliminating extensive preheating of the waste material prior to reaction, which can cause both solid deposition and corrosion. Instead, according to the present invention, the waste is heated to reaction temperature by the injected supercritical water which may itself be heated outside the reactor by any suitable means. As shown in FIGS. 1 and 2, for example, boiler-quality (i.e., clean) water from source 36 is fed via line 37 to heater 38, from which line 39 feeds heated water to the reaction zone through lines 40, 41, 42 and 43. In an alternative embodiment, pressurized colder water (e.g., about 4000 psi or higher and about 300° F.) may be injected into the reaction zone at or near the end of the reactor to quench the reaction products. In FIGS. 1 and 2, this embodiment is illustrated by stream 44.

The particular oxidant employed for the reaction is not critical, and gaseous oxygen is preferred. Other oxidants which may be employed include hydrogen peroxide, air, etc.

In general, the waste material to be treated according to the present invention may be any material containing organic and inorganic compounds. Typically, the waste material is an aqueous wastewater containing organic compounds, and even toxic organics, such as sewage sludges, pyrotechnics, dyes, phenols, etc. Additionally, materials such as municipal or industrial wastes, coal, etc., may be treated according to the present invention. The particular organic compounds which are contained in the waste material, and their concentration, is of importance only in regard to the rate of reaction and the maximum temperature achieved by the oxidation process. In other words, any organic compound in any concentration can be oxidized according to the present invention as long as the rate of reaction and maximum temperature can be controlled. In addition, when the process of the present invention is operated in the absence of oxygen or with less than the stoichiometric amount of oxygen (e.g., to separate the organic and inorganic components of the waste stream, as described below), the concentration of the waste material is less critical as long as the slurry or other form of waste material is pumpable or flowable.

In general, if necessary to provide pumpability or to reduce the heat content of the waste stream, water may be added. However, since addition of water, as well as the introduction of supercritical water to the reaction zone, increases the mass and volume of material flowing through the reaction zone, the size and hence the expense of the reactor may increase, as well as the expense of treating the liquid contained in the reaction products. It is therefore preferred that any pre-reaction addition of water to the waste material be limited to that amount necessary to make the waste flowable or pumpable and to prevent extreme reaction excursions.

The residence time of the reactants in the reaction zone is dependant on several factors, including the temperature, the size of the reactor, the flow rates of materials into and through the reaction zone, etc. As a general rule, the present invention permits reaction temperatures to be higher than the temperatures of prior art supercritical water oxidation processes. In the past, the maximum temperature of reaction in such processes was about 1100° F. due to the limitations of available reactor materials. At temperatures higher than about 1200° F. and high pressures, containment design using conventional reactor materials cannot be used due to lack of strength, resulting in excessive thickness as well as exposure to a corrosive environment. However, in the present invention, because the inner surface of the platelet tube reactor is protected by a thin film of supercritical water and the pressure containment tube temperature is limited to that of the clean supercritical water in the annulus, reaction temperatures higher than 1200° F. may be employed. Typically, in the process of the present invention, the reaction temperature may vary from about 1100° F. to about 1800° F., or higher, and is preferably about 1250° F. At those temperatures, the flow rates may be selected to provide a residence time in the reaction zone of about 5–20 seconds. In theory, the reaction temperature may be increased even further as long as a sufficient amount of supercritical water can be fed through the platelet tube walls to keep a protective film on its interior surface. The reaction temperature may be controlled by controlling the concentration of organics in the waste stream which in effect regulates the heat of reaction per pound of material in the reactor. The use of high reaction temperatures in the present invention provides a significant advantage. In particular, as the reaction temperature increases, the rate of the oxidation reaction increases and the reactor size may be correspondingly decreased because a shorter residence time is necessary. As a general rule, for every increase in reaction temperature of about 20°–30° F., the reaction rate approximately doubles.

The size and wall thickness of the reactor are not critical and may be varied to suit the particular requirements of any given situation. As a general rule, the size of the platelet tube will be determined by the amount of waste material being treated, its velocity and flow rate through the tube, the need to protect its inner surface with a thin film of supercritical water, etc. The pressure tube (shell) of the system is designed in accordance with established codes such as ASME Section I or Section VIII. The reactor or platelet tube design is dictated by the flow requirements of clean water through the platelets to protect the inner wall of the platelet tube.

The mechanical design of the platelet tube takes into account the pressure drop across the platelet tube wall (generally less than 500 psi) and the temperature which is controlled by the supercritical fluid flowing through the platelet tube wall (generally less than 1200° F.). The number of platelet holes or slots and their orientation is dictated by the nature of and the quantity of the waste stream being processed.

The materials of construction of the platelet tube reactor used in the present invention are not critical, and those skilled in the art can select appropriate materials of construction depending upon the waste being treated and the conditions of reaction. Typically, both the platelet tube and the outer shell will be constructed of an alloy which has good high temperature properties, corrosion resistance, stress corrosion crack resistance, etc. In fact, since the reactor shell is not in contact with the waste materials and typically is not exposed to the high temperatures existing in the central reaction zone, it is usually sufficient simply to fabricate a shell according to the well-known principles of high pressure vessels.

The size of the platelet tube reactor will vary depending principally upon the amount and type of waste to be treated. For example, in order to process 1.6 million pounds per hour of a liquid wastewater having a concentration of sludge of 20% with a HHV of 5,000 BTU per pound, it is estimated that four reactors would be required, each having a diameter of approximately 4 feet and a height of about 15 feet.

At the end of the reaction zone, the material exiting the reactor, which is a mixture of gaseous oxidation reaction products, insoluble inorganic material, and steam, is usually still at supercritical water conditions. After removing (venting) the gaseous products, it is desirable to cool the resulting gaseous/solid mixture to solubilize the solid inorganic material and to facilitate separation and disposal of the solids. This can be done using any convenient technique, such as dry physical separation (e.g., using a cyclone separator) or wet chemical separation.

A preferred method of cooling and separating the reaction product components is illustrated in FIGS. 1 and 2. As shown in those figures, the reactor 17 discharges directly into a liquid/gas separator 18 through inlet 55, and from which gaseous products are vented via stream 30. The solid and liquid components of the reaction mixture are cooled in separator 18 to a temperature of about 200° F. by means of a cooled recycle stream. It is desirable, and therefore preferred, to cool the reaction products as quickly as possible to re-solubilize the solid inorganics as a brine. This may be facilitated by supplying pressurized colder water at or near the end of the reactor, as described above, to quench the reaction products. The temperature of the quench water is not critical and may be at any temperature below supercritical; for example, about 300° F. The resulting cooled liquid/solid mixture is removed from separator 18 through outlet 56 via stream 19, at which point it is split into two streams 20 and 25. Stream 25 may be chemically treated, if desired, to neutralize any acids present by addition of an appropriate chemical (e.g., sodium hydroxide, etc.) from source 26 through line 27. The resulting neutralized material preferably has a pH of about 7. The resulting stream 28 is then cooled in heat exchanger 27 to a temperature below the supercritical temperature and recycled to separator 18 via line 29. It is preferred to tangentially introduce the recycle stream 29 into separator 18 above a channel separator 59 to provide a wetted wall and avoid salt accumulation.

Stream 20 can be cooled in heat exchanger 21 to facilitate disposal or further treatment.

Another possible alternative technique of separating the reaction products into their respective components is dry separation. For example, since the reaction product mixture is in vapor form, a cyclone separator may be used to separate the high temperature reaction products into their solid and vapor components. The vapor components may then be cooled, the water condensed out and the reaction products (such as carbon dioxide) may be then vented to the atmosphere.

As mentioned above, one embodiment of the present invention involves the use of a combustion device located at the reactor inlet to bring the incoming waste/oxidant stream up to reaction temperature. For example, a suitable combustor or burner may be located at the inlet of the platelet tube reactor. A suitable fuel (e.g., alcohol, methane, methanol or similar liquid or gaseous fuel) and oxygen (or other oxidant) are separately preheated externally of the reactor and fed to the burner at the reactor entrance. Ignition of the fuel occurs at the burner face and increases the temperature of the incoming waste stream. The type and amount of fuel, and the amount of oxygen, and their respective flow rates and temperatures may be varied to control the temperature increase experienced by the waste at the reactor inlet.

Figure 9:
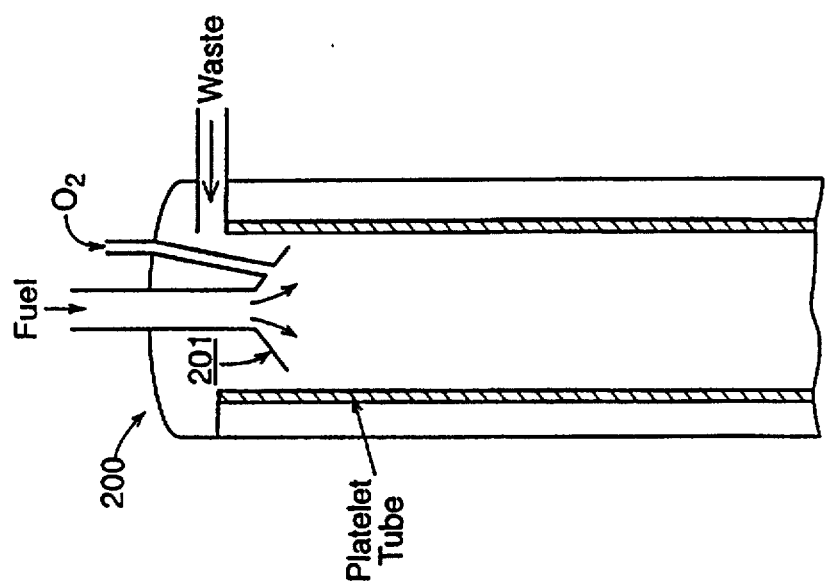
FIG. 9 schematically illustrates a burner which may be employed in the present invention to heat a waste material to reaction temperature.

FIG. 9 schematically illustrates a burner located at the inlet of the platelet tube. As shown in FIG. 9, the fuel and oxygen fed to the burner 200 are mixed in the area of a cone-shaped diffuser 201, surrounded by the waste stream. When the waste stream flows over the diffuser, a low pressure center is created at the diffuser face which induces circulation and mixing of the fuel and oxygen, thereby providing an efficient ignition and heating of the waste material. Liquid and gaseous fuels of any kind can be employed. Ignition of the fuel at the diffuser face of the burner is assured by preheating both the fuel and oxygen streams, using any suitable technique.

Figure 10:
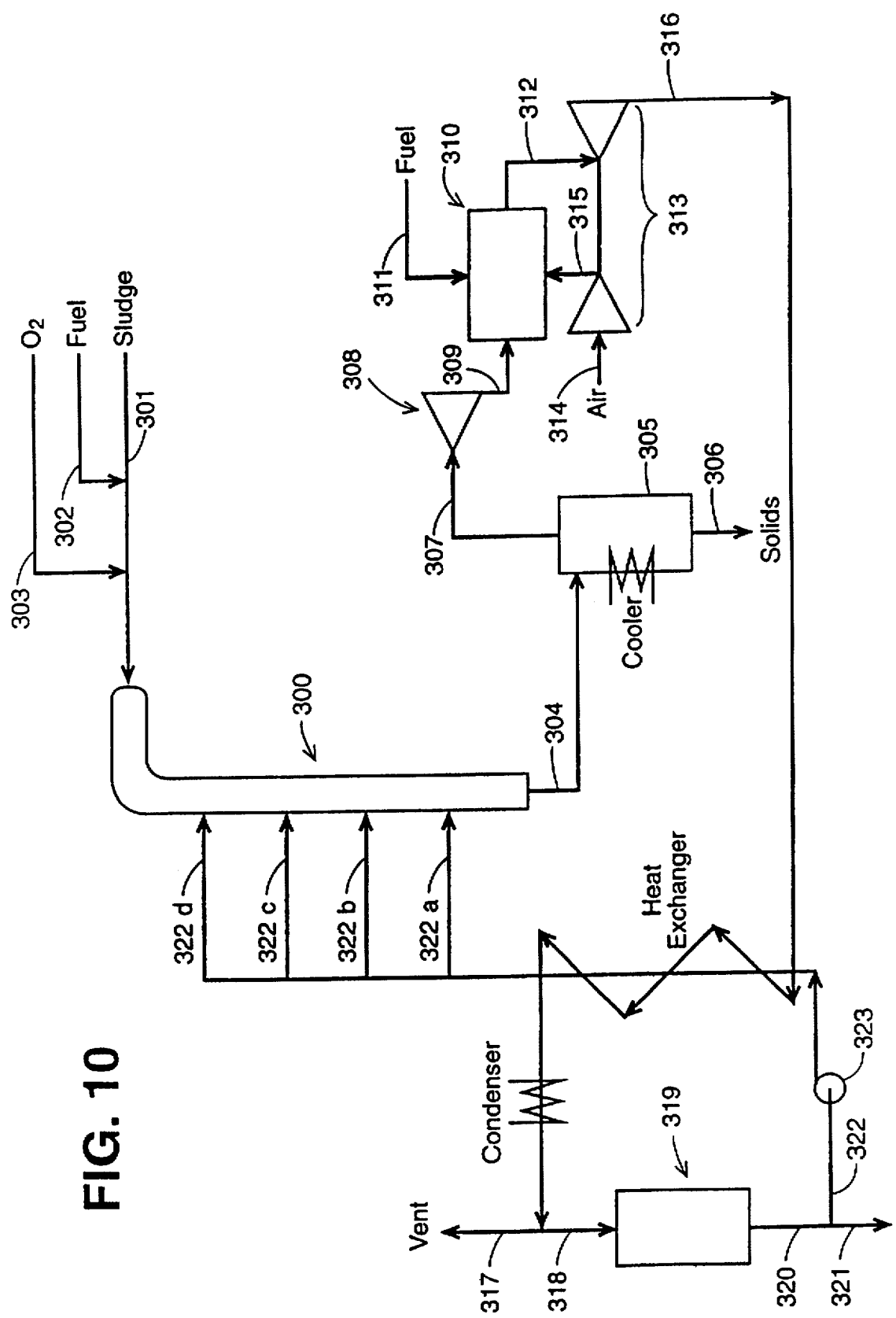
FIG. 10 illustrates another embodiment of the present invention in which a platelet tube reactor and supercritical water conditions are employed to separate the organic and inorganic components of a waste stream, followed by oxidation of the separated organic components.

The concept of preheating internally as described is also of particular interest in those cases where the waste or hydrocarbon containing slurry is treated at supercritical water conditions to effect separation of organic and inorganic materials. Oxidation of the separated organic materials may be performed outside of the reactor for purposes of generating power, etc. The internal preheater in the case described above serves the purpose of bringing the stream to be treated to the critical temperature and above to effect the separation desired. For example, FIG. 10 illustrates a platelet tube reactor system which may be employed to separate organics from a waste stream under supercritical conditions for subsequent oxidation. As shown in that figure, a waste material (such as a sewage sludge) is fed to platelet tube reactor 300 via stream 301. If necessary to heat the sludge stream, oxygen and/or fuel may be fed via streams 303 and 302, respectively. The materials exiting reactor 300 via stream 304 are at supercritical conditions and are fed to separator 305, where they are cooled and from which solids are removed via stream 306. The hot, pressurized gases are removed from separator 305 via line 307 and are fed to an expander generator 308, where the pressure is reduced from, e.g., about 4000 psi to about 300 psi. The temperature of the gases (and organics) in stream 307 is typically about 700° F.

The reduced pressure gases, at a temperature typically about 300° F., are then fed via line 309 to combustor 310, along with fuel (via line 311) if required to stabilize combustion of the organic substances. Air for combustion is fed via line 314 to turbine generator 313 and then to combustor 310 via line 315. The resulting gaseous oxidation reaction products, at a temperature of about 2300° F. and a pressure of about 230 psi, exit combustor 310 via line 312 and are fed to turbine generator 313, from which a reduced pressure gas stream is removed via line 316. Typically, gas stream 316 is at a temperature of about 1050° F. and a presure of about atmospheric. Of course, depending upon the process conditions selected, these temperature and pressure conditions may be different.

Gas stream 316 is used to heat water stream 322 in a heat exchanger, as shown, to about 750° F., after which it is passed through a condenser. Harmless combustion gases are vented through line 317 and the condensed water in stream 318 may be treated in apparatus 319 to provide potable water exiting via line 320. Water stream 320 may be split into stream 321, a source of potable water, and stream 322 for recycle to reactor 300. As shown, water stream 322, after being pressurized to about 4000 psi in pump 323 and heated to about 750° F., is fed to the annulus of reactor 300 via lines 322a, 322b, 322c and 322d, although the number and location of such points of introduction may be varied as desired to maintain supercritical conditions in reactor 300.

What is claimed is:

1. An improved apparatus useful for the supercritical water oxidation of organic waste material which comprises:

(a) a platelet tube reactor which comprises an inner platelet tube having a center reaction zone and supported within an outer tubular shell, thereby defining an annular space therebetween, said platelet tube being formed from a plurality of thin plates assembled into a tube shape and provided with a plurality of fluid passages from its outer surface to its inner surface leading to a plurality of apertures in the inner surface of said platelet tube;

(b) means for feeding a pressurized aqueous reaction mixture of said waste material and an oxidant source at ambient temperature to said center reaction zone;

(c) means for heating water externally of said reaction zone to at least supercritical conditions;

(d) means for feeding said externally heated supercritical water to at least one point along said annular space surrounding said platelet tube reactor, wherein the resulting pressure in said annular space is higher than the pressure in the center reaction zone within said platelet tube such that said supercritical water flows from said annular space through said fluid passages in the wall of said platelet tube and into said center reaction zone through said plurality of apertures, thereby forming a thin film of supercritical water over substantially the entire inner surface of said platelet tube and heating said mixture to reaction temperature; and (e) means to remove a resulting reaction product mixture from said reaction zone.

2. The apparatus of claim 1 further comprising:

(f) means for cooling said reaction product mixture and separating solids therefrom.

3. The apparatus of claim 2 further comprising:

(g) means for recycling a portion of said cooled reaction product mixture to said means (f).

4. The apparatus of claim 1 wherein said means (d) includes means for feeding said externally heated supercritical water to multiple points along said annular space.

5. The apparatus of claim 1 further comprising means located at the inlet of said reactor for igniting a fuel to increase the temperature of said pressurized aqueous reaction mixture.

* * * * *